(12) United States Patent
Peltier et al.

(10) Patent No.: US 12,320,264 B2
(45) Date of Patent: Jun. 3, 2025

(54) PLAIN BEARING FOR A PLANET GEAR OF A MECHANICAL REDUCTION GEAR WITH SILENT OPERATION

(71) Applicant: SAFRAN TRANSMISSION SYSTEMS, Colombes (FR)

(72) Inventors: Jordane Emile Andre Peltier, Moissy-Cramayel (FR); Dhafer Ghribi, Moissy-Cramayel (FR); Balint Pap, Moissy-Cramayel (FR); Antoine Jacques Marie Pennacino, Moissy-Cramayel (FR); Jean-Pierre Serey, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 18/517,978

(22) Filed: Nov. 22, 2023

(65) Prior Publication Data

US 2024/0175374 A1    May 30, 2024

(30) Foreign Application Priority Data

Nov. 24, 2022    (FR) ........................ 2212242

(51) Int. Cl.
     *F01D 25/18*      (2006.01)
     *F01D 25/16*      (2006.01)
     *F16H 57/08*      (2006.01)

(52) U.S. Cl.
     CPC ......... *F01D 25/166* (2013.01); *F01D 25/183* (2013.01); *F16H 57/08* (2013.01);
(Continued)

(58) Field of Classification Search
     CPC .............. F01D 25/166; F01D 25/183; F05D 2260/40311; F16H 2057/085; F16H 57/08
See application file for complete search history.

(56) References Cited

U.S. PATENT DOCUMENTS 3,257,869 A *   6/1966   Sharples ............... F16H 1/2836
                                                         475/347
4,392,695 A *   7/1983   Miller ................... F16C 23/084
                                                         384/477

(Continued)

FOREIGN PATENT DOCUMENTS

FR          2987416 A1     8/2013
FR          3041054 A1     3/2017
(Continued)

OTHER PUBLICATIONS

Preliminary Research Report received for French Application No. 2212242, mailed on May 10, 2023, 3 pages (1 page of French Translation Cover Sheet and 2 pages of original document).

*Primary Examiner* — Tisha D Lewis (74) *Attorney, Agent, or Firm* — WOMBLE BOND DICKINSON (US) LLP (57) ABSTRACT

A plain bearing for a planet gear of a turbomachine mechanical reduction gear, the plain bearing having an annular barrel with an axis which delimits at least one central bore centred on the axis, and the barrel having annular grooves which extend around the axis and which open out axially in opposite orientations at the axial ends of the barrel, each annular groove being delimited by two coaxial internal and external walls of the barrel connected by a transverse bottom wall which has at least one opening which opens into a cavity which is formed in the barrel between said the at least one central bore and a periphery of the barrel, characterised in that wherein each cavity is closed by a sealing seal.

12 Claims, 7 Drawing Sheets

(52) U.S. Cl.
    CPC ............ *F05D 2260/40311* (2013.01); *F16H 2057/085* (2013.01)

(56) References Cited

U.S. PATENT DOCUMENTS

| | | | |
|---|---|---|---|
| 2010/0317478 A1* | 12/2010 | McCune | F01D 25/186 |
| | | | 475/159 |
| 2013/0225353 A1 | 8/2013 | Gallet et al. | |
| 2013/0324343 A1* | 12/2013 | Gallet | F16H 3/44 |
| | | | 475/159 |
| 2020/0088104 A1* | 3/2020 | Kallianteris | F16H 57/082 |
| 2020/0271008 A1 | 8/2020 | Dombek et al. | |
| 2020/0271059 A1 | 8/2020 | Lemoine et al. | |
| 2020/0332884 A1 | 10/2020 | Di et al. | |
| 2023/0193991 A1* | 6/2023 | Uhkötter | F02C 7/36 |
| | | | 475/159 |

FOREIGN PATENT DOCUMENTS

| | | | | |
|---|---|---|---|---|
| FR | 3071022 A1 | 3/2019 | | |
| FR | 3071023 A1 | 3/2019 | | |
| FR | 3066792 B1 * | 7/2019 | ............ | F02C 7/06 |
| FR | 3095252 A1 | 10/2020 | | |
| WO | 2010/092263 A1 | 8/2010 | | |

* cited by examiner

PLAIN BEARING FOR A PLANET GEAR OF A MECHANICAL REDUCTION GEAR WITH SILENT OPERATION

TECHNICAL FIELD OF THE INVENTION

The invention relates to a plain bearing for a planet gear of a turbomachine mechanical reduction gear, and a mechanical reduction gear comprising such a plain bearing.

TECHNICAL BACKGROUND

The prior art includes, in particular, the documents WO-A1-2010/092263, FR-A1-2 987 416, FR-A1-3 041 054, FR-A1-3 071 022, FR-A1-3 071 023, FR-A1-3 071 023 and FR-A1-3 095 252.

The role of a mechanical reduction gear is to modify the speed and torque ratio between the input axle and the output axle of a mechanism.

The new-generation turbomachines, in particular, dual flow turbomachine with a high bypass ratio, comprise a mechanical reduction gear to drive the shaft of a fan. The usual purpose of the reduction gear is to convert the rotational speed referred to as high speed of the shaft of a power turbine into a slower rotational speed for the shaft driving the fan.

Such a reduction gear comprises a central pinion, referred to as sun gear, a ring gear and pinions referred to as planet gears, which are engaged between the sun gear and the ring gear. The planet gears are held in place by a frame referred to as a planet carrier. The sun gear, the ring gear and the planet carrier are planetary because their axes of revolution coincide with the longitudinal axis X of the turbomachine. The planet gears each have a different axis of revolution Y, and are equally distributed on the same operating diameter around the axis of the planetary. These axes Y are parallel to the longitudinal axis X.

There are several reduction gear architectures. In the prior art of the dual-flow turbomachines, the reduction gears are of the planetary or epicyclic type. In other similar applications, there are architectures referred to as differential or "compound".

In a planetary reduction gear, the planet carrier is stationary, and the ring gear is the output shaft of the device which rotates in the opposite orientation of the sun gear,
In an epicyclic reduction gear, the ring gear is stationary, and the planet carrier is the output shaft of the device which rotates in the same orientation as the sun gear,
On a compound reduction gear, no element is attached in rotation.

The ring gear rotates in the opposite orientation of the sun gear and of the planet carrier.

The reduction gears may comprise one or more meshing stages. This meshing is ensured in different ways such as by contact, friction, or magnetic field. There are several types of meshing by contact such as straight or herringbone toothings.

A reduction gear needs to be lubricated and the supply of lubricating oil to the rotating components of a reduction gear can be problematic. The oil is generally fed to the reduction gear by a lubricating oil dispenser.

The planet gears are guided in rotation by lubricated bearings. The bearings can be made up of rolling elements (ball bearings, roller bearings, conical bearings, etc.) or can be plain or hydrodynamic bearings.

In the latter case, each planet gear is mounted in rotation on and around a plain bearing, which is supplied with oil by the dispenser and is configured to form an oil film between the external periphery of the bearing and the internal periphery of the planet gear. For this purpose, in the current technique, each planet gear comprises an internal cylindrical surface which extends around an external cylindrical surface of the bearing, and which delimits with the latter an annular space for the formation of the oil film. This space is supplied with oil through oil passage orifices which are formed in a barrel of the bearing and extend from the external cylindrical surface to a central bore of the barrel which is supplied with oil by the aforementioned dispenser.

The plain bearings are massive elements of the reduction gear, the number of which is generally between 3 and 7. The greater the mass of the bearings, the greater the impact on the weight of a reduction gear, and therefore of a motor. Furthermore, the greater the mass of the bearings, the more likely it is that the bearings will orbit around the motor (planetary) axis, and the greater the risk of harmful consequences such as unbalance, high-amplitude vibrations and radial forces on the planet carrier, causing misalignment between the sun gear, the planet gears and the ring gear. In addition, the greater the mass of the bearings, the more likely they are to shear the oil film between the bearing and the planet gear due to the centrifugal forces to which they are subjected, which generates friction losses in the areas where the oil film breaks.

To limit the mass of each bearing, it has traditionally been proposed to make them lighter.

In a known way, each bearing has an axial annular barrel which delimits a central bore centred on the axis of the barrel. The barrel has annular grooves which extend around its axis, and which open axially in opposite orientations at the axial ends of the barrel. Each annular groove is delimited by two coaxial internal and external walls of the barrel connected by a transverse bottom wall which has at least one opening which opens into a cavity formed in the barrel between the central bore and the periphery of the barrel.

The barrel may comprise a plurality of openings which may be evenly spaced around the central bore. The cavities can be arranged in the extension of the openings, for example in the form of substantially straight cylindrical ducts or axes inclined with respect to the axis of the central bore, obtained by drilling or moulding. The ducts may cross the bearings along their entire length or on the contrary be blind. The cavities can also be larger than the openings and form pouches in the barrel, in particular, if they are formed in the barrel by moulding. In any case, the cavities make the barrel lighter.

Advantageously, the internal and external walls of each groove give flexibility to the axial ends of the bearing and limit the deformation of the bearing, thus ensuring good radial alignment of the toothing of the planet gear pinions with the central pinion and the external ring gear.

However, it has been found that the presence of the cavities is a significant source of noise when the bearings are rotating due to the rotation of the planet carrier.

It is therefore necessary to limit the noise generated by the rotation of the bearings accompanying the planet carrier.

SUMMARY OF THE INVENTION

The invention remedies the above disadvantage by at least partially sealing each cavity.

To this end, the invention proposes a plain bearing for a planet gear of a turbomachine mechanical reduction gear, the plain bearing having an annular barrel of axis Y which delimits at least one central bore centred on the axis Y, and the barrel having annular grooves which extend around the axis Y and which open axially in opposite orientations at the axial ends of the barrel, each annular groove being delimited by two internal and external walls of the barrel connected by a transverse bottom wall which has at least one opening which opens into a cavity which is formed in the barrel between said at least one central bore and a periphery of the barrel, characterised in that each cavity is closed by a sealing means.

Sealing the cavities prevents air or oil from entering them, thus eliminating any source of noise. It does, however, allow a plain bearing of reduced mass to be maintained due to the presence of the cavities.

According to other characteristics of the bearing:
the sealing means is a closure plate which extends in contact with the bottom wall across said at least one opening,
the sealing means is a filling material which is introduced into said cavity and at least partially fills it,
each cavity is closed by a plug which is received in the corresponding opening and at least partly in said cavity,
each cavity is a cylindrical duct, in particular a drilling, which opens out via its opening in the bottom wall, and each plug comprises a cylindrical body which has a diameter corresponding to a diameter of said cylindrical duct and which is received in said duct,
the plug comprises, at one end of its cylindrical body, a head which has a cross-section greater than the diameter of said cylindrical duct and which is capable of bearing against the bottom wall,
the plug is fitted, shrunk, crimped, or glued into the opening and/or cavity,
the cylindrical body of the plug comprises a thread and said body is screwed into a complementary tapping formed in the cylindrical duct,
the plug is made of steel, aluminium or a thermoplastic material.

The invention also relates to a mechanical reduction gear for an aircraft gas turbomachine, comprising an outer ring gear and planet gear pinions engaged with the central pinion and with the outer ring gear and each mounted to rotate freely on a planet carrier, the planet gear pinions each being rotatable about a planet gear axis via a plain bearing of the type described above.

BRIEF DESCRIPTION OF THE FIGURES

Further characteristics and advantages of the invention will become apparent from the following detailed description, for the understanding of which reference is made to the attached drawings in which.

DETAILED DESCRIPTION OF THE INVENTION

Figure 1:
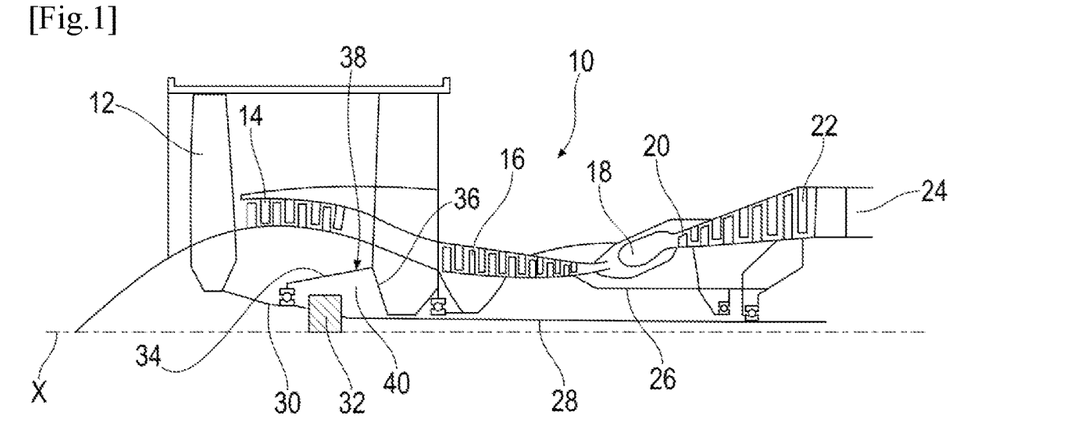
FIG. 1 is a schematic axial cross-sectional view of a turbomachine using the invention.

FIG. 1 describes a turbomachine 10 of axis X which comprises, in conventional form, a fan 12, a low-pressure compressor 14, a high-pressure compressor 16, an annular combustion chamber 18, a high-pressure turbine 20, a low-pressure turbine 22 and an exhaust nozzle 24. The high-pressure compressor 16 and the high-pressure turbine 20 are connected by a high-pressure shaft 26 and together form a high-pressure (HP) body. The low-pressure compressor 14 and the low-pressure turbine 20 are connected by a low-pressure shaft 28 and together form a low-pressure (LP) body.

The fan 12 is driven by a fan shaft 30 which is driven by the LP shaft 28 by means of a reduction gear 32. This reduction gear 32 is generally of the planetary or epicyclic type.

The following description relates to a reduction gear of the epicyclic type, in which the planet carrier and the sun gear are mobile in rotation, the ring gear of the reduction gear being stationary in the reference frame of the engine.

The reduction gear 32 is positioned in the upstream portion of the turbomachine. In this application, the expressions upstream and downstream refer to the general flow of the gases in the turbomachine, along its axis of elongation or rotation of its rotors.

A stationary structure comprising schematically, here, an upstream portion 34 and a downstream portion 36 which comprises the motor casing or stator 38 is arranged so as to form an enclosure 40 surrounding the reduction gear 32. This enclosure 40 is closed upstream by seals at the level of a bearing through which the fan shaft 30 passes, and downstream by seals at the level of the LP shaft 28.

Figure 2:
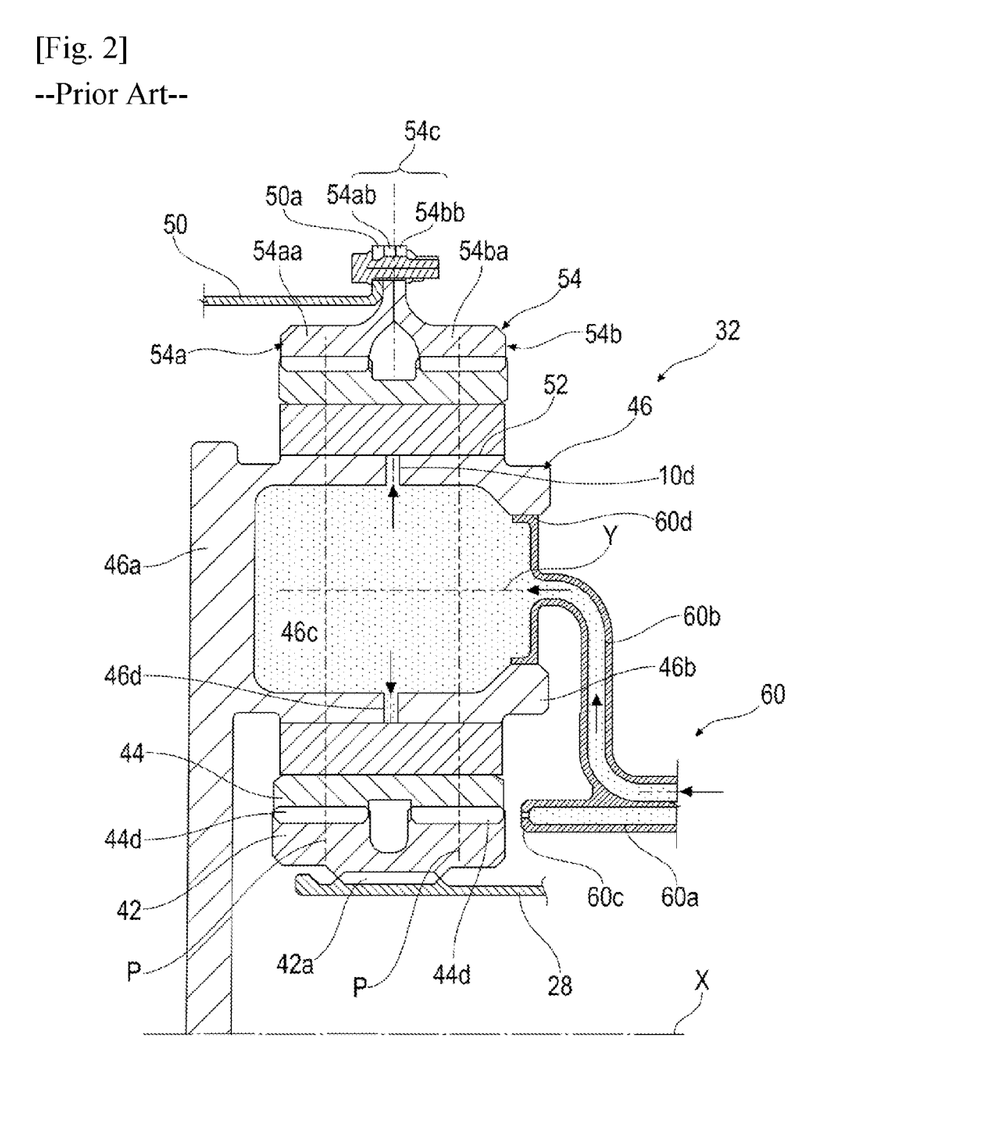
FIG. 2 is a partial axial cross-sectional view of a mechanical reduction gear according to the prior art.

FIG. 2 shows an epicyclic reduction gear 32. At the input, the reduction gear 32 is connected to the LP shaft 28, for example via internal splines 42a. The LP shaft 28 drives a central planetary pinion 42, also referred to as the sun gear. Classically, the sun gear 42, whose axis of rotation is coincident with that of the turbomachine X, drives a series of pinions referred to as planet gears 44, which are equally distributed on the same diameter around the axis of rotation X. This diameter is equal to twice the operating centre distance between the sun gear 42 and the planet gears 44. The number of planet gears 44 is generally defined between three and seven for this type of application.

The set of the planet gears 44 is held by a frame referred to as planet carrier 46. Each planet gear 44 rotates about its own axis Y and meshes with a ring gear 54. In the output we have:

In this epicyclic configuration, the set of the planet gears 44 drives the planet carrier 46 in rotation about the axis X of the turbomachine. The ring gear 54 is attached to the engine casing or stator 38 via a ring gear carrier 50 and the planet carrier 46 is attached to the fan shaft 30.

In another planetary configuration, the set of the planet gears 44 is maintained by a planet carrier 46 which is attached to the engine casing or stator 38. Each planet gear 44 drives the ring gear 54, which is attached to the fan shaft 30 via a ring gear carrier 50.

Each planet gear 44 comprises an internal range 52 which is mounted to rotate freely by means of a plain bearing 46b which is a bearing of the rolling bearing or hydrodynamic bearing type. Each plain bearing 46b is attached to the planet carrier 46 and all plain bearings 46b are positioned with respect to each other using one or more structural frames 46a of the planet carrier 46. There are several plain bearings and internal ranges 52 equal to the number of planet gears. For reasons of operation, assembly, manufacture, inspection, repair or replacement, the bearings 46b and the frame 46a may be separated into several parts.

For the same reasons mentioned above, the toothing of a reduction gear can be split into several helixes, each with a median plane P. In our example, we detail the operation of a multi-helix reduction gear with a ring gear 54 separated into two half-ring gears 54a and 54b:

An upstream half-ring gear 54a consisting of a rim 54aa and a mounting half-flange 54ab. The upstream helix of the toothing of the reduction gear is located on the rim 54aa. This upstream helix meshes with that of the planet gear 44 which meshes with that of the sun gear 42.

A downstream half-ring gear 54b consisting of a rim 54ba and a mounting half-flange 54bb. The downstream helix of the toothing of the reduction gear is located on the rim 54ba. This downstream helix meshes with that of the planet gear 44 which meshes with that of the sun gear 42.

If the helix widths vary between the sun gear 42, the planet gears 44 and the ring gear 54 because of the toothing overlaps, they are all centred on a median plane P for the upstream helixes and on another median plane P for the downstream helixes. In the case of a two-row roller bearing, each row of rolling elements is also preferably, but not necessarily, centred on two median planes.

The mounting half-flange 54ab of the upstream ring gear 54a and the mounting half flange 54bb of the downstream ring gear 54b form the fastening flange 54c of the ring gear. The ring gear 54 is attached to a ring gear carrier by assembling the fastening flange 54c of the ring gear and the fastening flange 50a of the ring gear carrier 50 using a bolted assembly, for example.

The arrows in FIG. 2 describe the conveying of the oil in the reduction gear 32. The oil enters the reduction gear 32 from the stator portion 38 into a dispenser 60 by different means which will not be specified in this view because they are specific to one or more types of architecture. The dispenser 60 comprises injectors 60a and arms 60b. The function of the injectors 60a is to lubricate the toothing and the function of the arms 60b is to lubricate the bearings. The oil is fed to the injector 60a and emerges from the end 60c to lubricate the toothings.

The oil is also supplied to the arm 60b and circulates via the inlet 60d of the bearing 46b. The oil then flows through the plain bearing 46b into one or more bores 46c and then out through pipes 46d to lubricate the internal ranges 52 of the planet gears 44.

Figure 3:
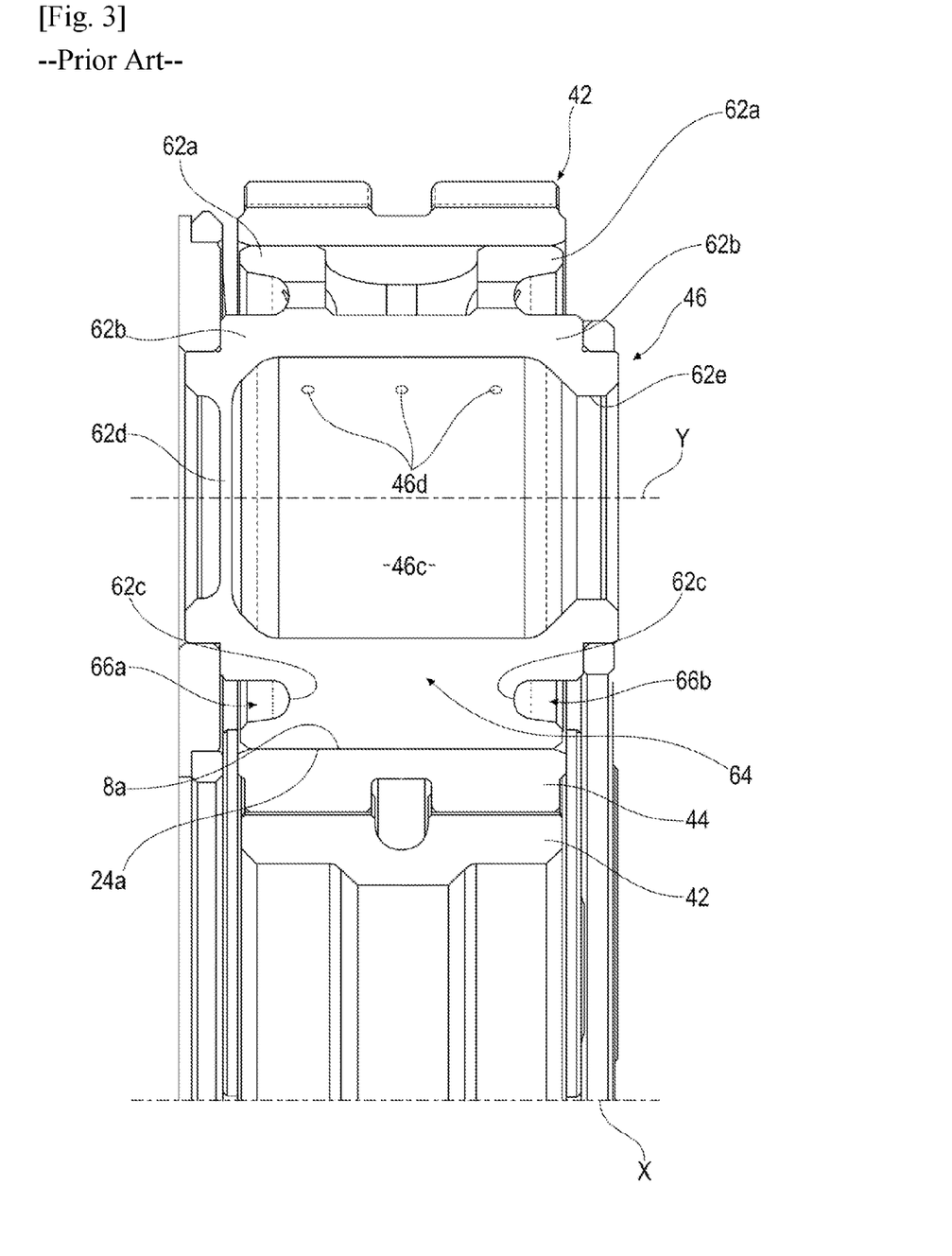
FIG. 3 is a view similar to that of FIG. 2 and represents a mode of manufacture of a mechanical reduction gear comprising planet gears with plain bearings according to the prior art.

FIG. 3 shows another mechanical reduction gear 32 comprising planet gears 44 mounted on hydrodynamic bearings or plain bearings known in the art. In this example, the plain bearing 46b and the structural frame 46a are in two parts.

The plain bearing 46b of each planet gear 42 comprises a one-piece annular barrel 64 in the example shown here which comprises two coaxial external 62a and internal 62b annular walls which extend around each other, and which are connected together by a transverse bottom wall 62c.

The internal annular wall 62b and the bore 46c are closed by a partition 62d and comprise on the opposite side an axial end 62e open on the opposite side to receive in the bore 46c lubricating oil supplied by the oil dispenser (not shown).

The plain bearing 46b comprises pipes 46d for conveying lubricating oil from the bore 46c to the external periphery of the bearing 46b.

The coaxial annular walls 62a, 62b delimit between them annular grooves 66a, 66b. This configuration gives the bearing 46b a degree of flexibility at the level of each of its axial ends.

The bearing 46b thus comprises a first annular groove 66a located on one side and the opening of which opens out in the axial direction, and a second annular groove 66b located on the opposite side of the bearing and the opening of which opens out axially on the opposite side to the groove 66a. These grooves 66a, 66b are generally U-shaped in cross-section.

Figure 4:
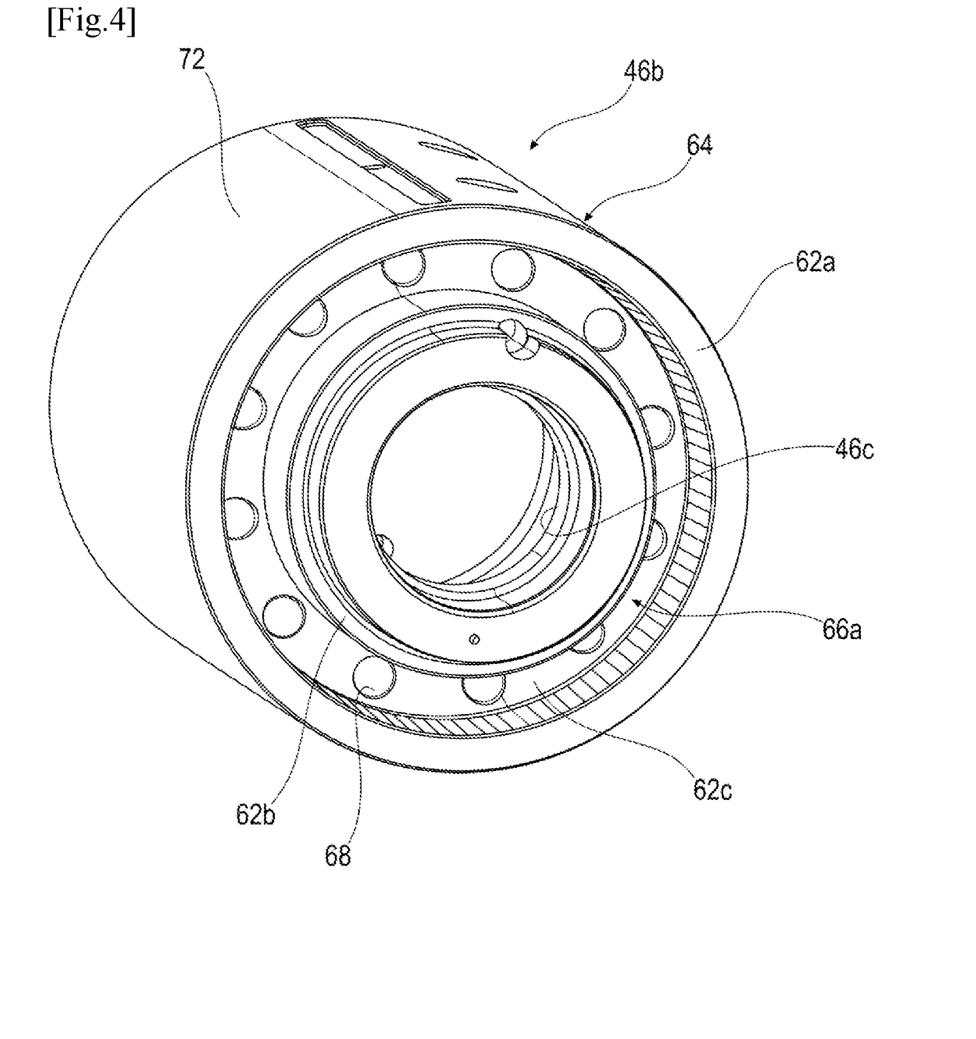
FIG. 4 is a perspective view of a reduction gear plain bearing according to the invention.
Figure 5:
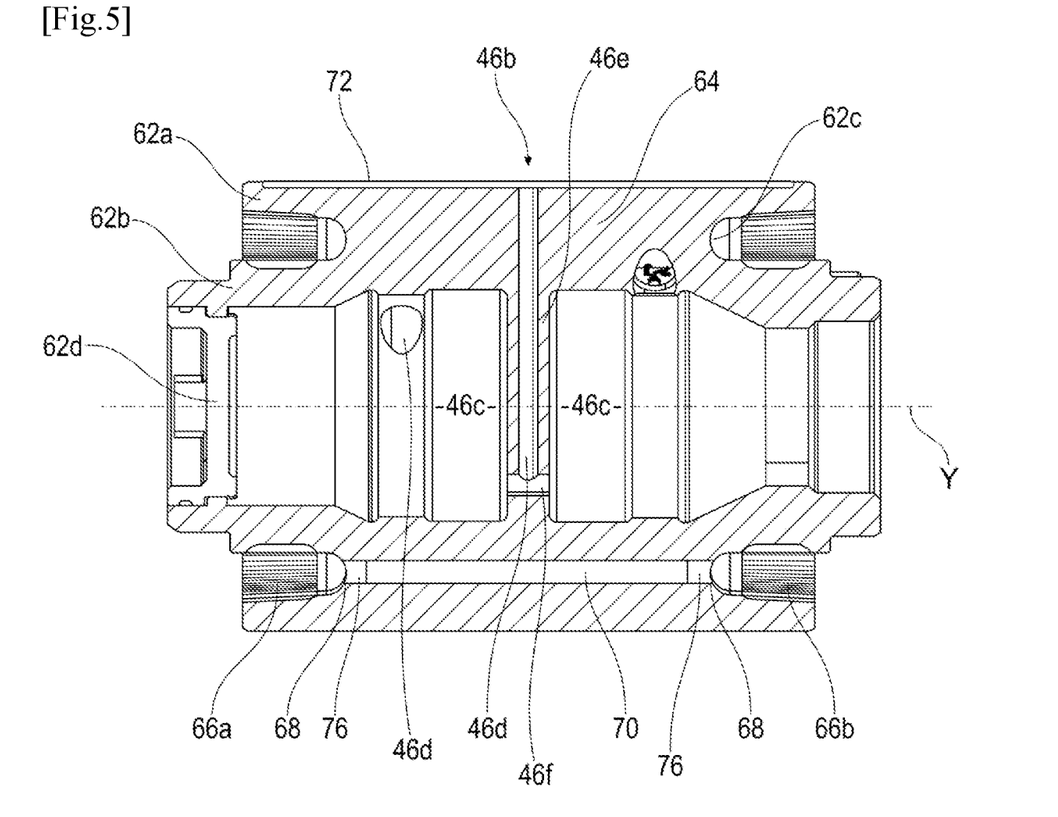
FIG. 5 is a cross-sectional view of the plain bearing in FIG. 4.
Figure 6:
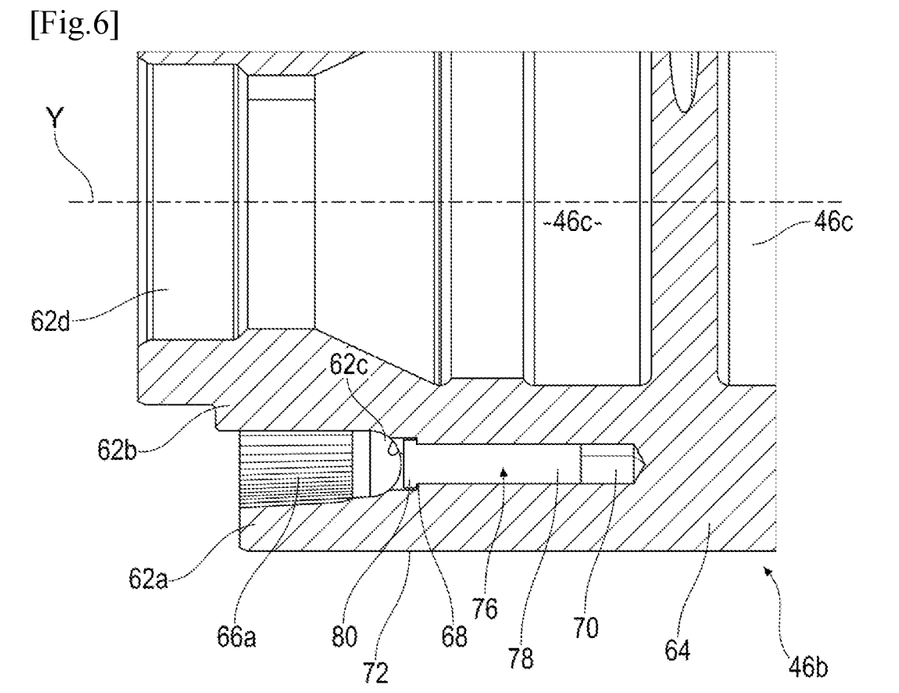
FIG. 6 is a detailed cross-sectional view of the plain bearing in FIG. 6.

FIGS. 4 to 6 show in particular a plain bearing 46b according to the invention. In a non-limiting manner, the plain bearing 46b comprises two bores 46c, one of which is closed by a partition 62d, and which are separated by a transverse wall 46e in which one of the ducts 46d is formed, a T-shaped branch 46f of which connects the two bores 46c so that they communicate with each other.

On each side of the barrel 64, each transverse bottom wall 62c has at least one opening 68 which opens into a cavity 70 which is formed in the barrel 64, radially between said at least one central bore 46c and a periphery 72 of the barrel 64. In the example shown in FIG. 5, the barrel 64 comprises a single cavity 70, common to pairs of opposing openings 68 aligned along an axis Y parallel to the axis X. This configuration does not limit the invention and, as illustrated in FIG. 6, the openings 68 could communicate with blind cavities 70 that do not communicate with each other.

In the example shown here, each cavity 70 is a cylindrical duct, which opens into the bottom wall 62c via its opening 68. The cylindrical duct can be obtained by moulding or drilling, and so the opening 68 is circular and of the same diameter as the duct forming the cavity 70.

It will of course be understood that this configuration is not limitative of the invention. The cavity 70 need not be cylindrical and can take any shape to lighten the barrel 64. For example, the cavity 70 could form a pouch in the material of the barrel, with dimensions greater than those of the opening 68. The opening 68 could also be non-circular, without limiting the invention.

The cavities 70 allow the barrel 64 to be lightened. However, it has been found that the presence of the cavities 70 is a significant source of noise when the bearings 46b are rotating due to the rotation of the planet carrier.

In accordance with the invention, to remedy this disadvantage, each cavity 70 is closed by a sealing means 76.

According to a first embodiment of the invention not shown in the figures, the sealing means could be a closure plate which extends in contact with the bottom wall 62c across said at least one opening 68. In particular, such a plate could be annular and fit the bottom wall 62c, being housed in the grooves 66a, 66b to cover all the openings.

According to a second embodiment of the invention not shown in the figures, the sealing means could be a filling material which is introduced through the opening 68 into the cavity 70 and at least partially fills it. The material can be solidified in the cavity 70 to prevent it escaping. Preferably, the filling material is injected, cast or moulded into the cavity 70.

Figure 7:
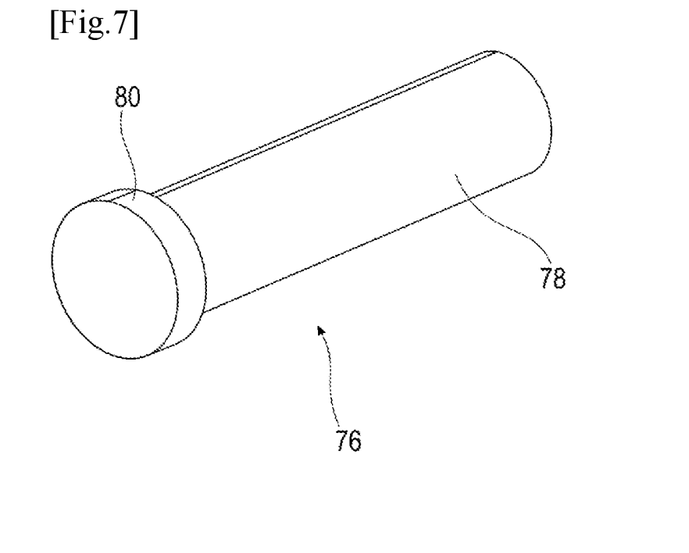
FIG. 7 is a perspective view of a plug for a plain bearing according to the invention.

According to a third embodiment of the invention shown in FIGS. 5 to 7, each cavity is closed by a plug forming the sealing means 76, which is received in the corresponding opening 68 and at least partly in the cavity 70.

The plug 76 is designed to be adapted to the opening 68. To this end, it has the same cross-section as the opening 68 or is deformable and expandable so that it can be inserted and expanded, sealing the opening 68.

As we have seen, in the example shown in FIGS. 5 and 6, each cavity 70 is a cylindrical duct, which opens into the bottom wall 62c via its opening 68. In this configuration, as can also be seen in FIG. 7, each plug 76 comprises a cylindrical body 78 which has a diameter corresponding to a diameter of the cylindrical duct 70 and which is received in said duct.

To limit the penetration of the plug 76 into the cavity 68, the latter comprises, at one end of its cylindrical body 78, a head 80 which has a cross-section greater than the diameter of the cylindrical duct 70 and which is capable of bearing against the bottom wall 62c.

The plug 76 is preferably immobilised in the opening 68. Also, whatever its design, the plug 76 is fitted, shrunk, crimped, or glued into the opening 68 and/or the cavity 70.

When the cavity 70 is cylindrical as shown in FIGS. 5 and 6, the cylindrical body 78 of the plug 76 may comprise a thread and be screwed into a complementary tapping formed in the cylindrical duct 70. In this case, it will be understood that the head 80 of the plug may comprise an indentation complementary to a screwing tool.

The plug 76 is made of steel, aluminium or a thermoplastic material. It can also be made of foam, which has the advantage of gorging itself with lubricating oil to ensure the sealing of the plug 76.

The invention therefore allows to benefit from a reduction gear 32 of a gas turbomachine for aircraft, such as a reduction gear 32 of the planetary or epicyclic type, comprising an outer ring gear 54 and planet gear pinions 44 engaged with a central pinion 42 and with the outer ring gear 54 and each mounted so as to rotate freely on a planet carrier 46, the planet gear pinions 44 each being able to rotate about a planet gear axis Y by means of a bearing 46b of the type described above. A reduction gear 42 of this type is more silent in operation with respect to known reduction gears in the prior art.

The invention claimed is:

1. A plain bearing for a planet gear of a turbomachine mechanical reduction gear, the plain bearing having an annular barrel with an axis which delimits at least one central bore centred on the axis, and the barrel having annular grooves which extend around the axis and which open axially in opposite orientations at the axial ends of the barrel, each annular groove being delimited by two internal and external walls of the barrel connected by a transverse bottom wall which has at least one opening which opens into a cavity which is formed in the barrel between said at least one central bore and a periphery of the barrel,
wherein the plain bearing comprises a sealing means closing each cavity, the sealing means being configured to prevent air or oil from entering in the cavity when the plain bearing is rotating around the axis.

2. The plain bearing according to claim 1, wherein the sealing means extends in contact with the bottom wall across said at least one opening.

3. The plain bearing as claimed in claim 1, wherein the sealing means comprises a filling material which is introduced into said cavity and at least partially fills it.

4. The plain bearing according to claim 1, wherein each cavity is closed by a plug forming the sealing means which is received in the corresponding opening and at least partly in said cavity.

5. The plain bearing according to claim 4, wherein each cavity is a cylindrical duct, in particular a drilling, which opens out via its opening into the bottom wall, and in that each plug comprises a cylindrical body which has a diameter corresponding to a diameter of said cylindrical duct and which is received in said duct.

6. The plain bearing according claim 5, wherein the plug comprises, at one end of its cylindrical body, a head, a cross-section of which is greater than the diameter of said cylindrical duct and which is capable of bearing against the bottom wall.

7. The plain bearing according to claim 4, wherein the plug is fitted, shrunk, crimped or glued in the opening and/or in the cavity.

8. The plain bearing according to claim 5, wherein the cylindrical body of the plug comprises a thread and in that said body is screwed into a complementary tapping formed in the cylindrical duct.

9. The plain bearing according to claim 4, wherein the plug is made of steel, aluminium or a thermoplastic material.

10. A mechanical reduction gear for an aircraft gas turbomachine, comprising an outer ring gear and planet gear pinions engaged with a central pinion and with the outer ring gear and each mounted to rotate freely on a planet carrier, the planet gear pinions each being rotatable about a planet gear axis via a plain bearing according to claim 1.

11. A plain bearing for a planet gear of a turbomachine mechanical reduction gear, the plain bearing having an annular barrel with an axis which delimits at least one central bore centred on the axis, and the barrel having annular grooves which extend around the axis and which open axially in opposite orientations at the axial ends of the barrel, each annular groove being delimited by two internal and external walls of the barrel connected by a transverse bottom wall which has at least one opening which opens into a cavity which is formed in the barrel between said at least one central bore and a periphery of the barrel,
wherein each cavity is closed by a plug forming a sealing means which is received in the corresponding opening and at least partly in said cavity, and
wherein each cavity is a cylindrical duct, in particular a drilling, which opens out via its opening into the bottom wall, and in that each plug comprises a cylindrical body which has a diameter corresponding to a diameter of said cylindrical duct and which is received in said duct.

12. A mechanical reduction gear for an aircraft gas turbomachine, comprising an outer ring gear and planet gear pinions engaged with a central pinion and with the outer ring gear and each mounted to rotate freely on a planet carrier, the planet gear pinions each being rotatable about a planet gear axis via a plain bearing according to claim 11.

* * * * *